United States Patent
Tsai et al.

(10) Patent No.: US 7,738,171 B2
(45) Date of Patent: Jun. 15, 2010

(54) AUTOSTEREOSCOPIC DISPLAY APPARATUS

(75) Inventors: Chao-Hsu Tsai, Hsinchu (TW); Kuen Lee, Hsinchu (TW); Kuo-Chung Huang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 286 days.

(21) Appl. No.: 11/308,370

(22) Filed: Mar. 20, 2006

(65) Prior Publication Data
US 2007/0139768 A1    Jun. 21, 2007

(30) Foreign Application Priority Data
Dec. 16, 2005    (TW) .............................. 94144666 A (51) Int. Cl.
*G02B 27/22* (2006.01)
(52) U.S. Cl. .......................................... 359/463; 353/8
(58) Field of Classification Search ........................ None
See application file for complete search history.

(56) References Cited

U.S. PATENT DOCUMENTS

| | | | | |
|---|---|---|---|---|
| 4,101,188 A | * | 7/1978 | Yevick ........................ 385/119 |
| 5,896,225 A | * | 4/1999 | Chikazawa .................. 359/463 |
| 5,917,562 A | * | 6/1999 | Woodgate et al. ............. 349/15 |
| 6,064,424 A | | 5/2000 | van Berkel et al. ............ 348/51 |
| 6,128,132 A | * | 10/2000 | Wieland et al. .............. 359/463 |
| 6,437,915 B2 | | 8/2002 | Moseley et al. .............. 359/465 |
| 6,948,819 B2 | * | 9/2005 | Mann .......................... 353/28 |
| 2004/0130503 A1 | * | 7/2004 | Hamagishi et al. ............. 345/6 |
| 2004/0165262 A1 | * | 8/2004 | Alejo Trevijano ........... 359/462 |

FOREIGN PATENT DOCUMENTS

WO    WO 98/10404    3/1998

* cited by examiner

*Primary Examiner*—Lee Fineman
(74) *Attorney, Agent, or Firm*—Jianq Chyun IP Office (57) ABSTRACT

An autostereoscopic display apparatus includes multiple micro-display devices for exporting an 3-dimensional image. Each of the micro-display devices produces a portion image of the image. The portion image has multiple viewing-zone portion images with respect to multiple viewing zones. An image guiding unit has multiple micro-image output terminals, which are arranged according to an array sequence being set, so as to guide the output images from the micro-display devices. A stereo-image discrete screen is coupled with the image guiding unit, so that the image can transit the stereo-image discrete screen through multiple column transparent regions for producing multiple viewing-zone images of the image with respect to the different viewing zones. The image guiding unit can be, for example, an optical fiber array unit or an array-type light guiding unit.

20 Claims, 8 Drawing Sheets

AUTOSTEREOSCOPIC DISPLAY APPARATUS

CROSS-REFERENCE TO RELATED APPLICATION

This application claims the priority benefit of Taiwan application serial no. 94144666, filed on Dec. 16, 2005. All disclosure of the Taiwan application is incorporated herein by reference.

BACKGROUND OF THE INVENTION

1. Field of Invention

The present invention relates to a stereo-image display technology. More particularly, the present invention relates to an autostereoscopic display apparatus, by which users can see the stereo-image just by naked eyes within a range of viewing angle.

2. Description of Related Art

Image is an effective method for transferring information. Along with the improvement of science and technology, besides the image printed on the paper, many images are displayed in digital on a display device. As the display screen of the display device is a plane structure formed by a pixel array, there is no stereoscopic display effect.

However, according to the visual characteristic of human eyes, a stereo-image may be produced when the left and the right eyes respectively see the two images with the same image but different parallax. The former stereoscopic display technology exports the two images utilizing the polarization effect, and users need to put on the polarized glasses to see the stereoscopic effect. The stereoscopic display mode is not convenient in use.

Next, the autostereoscopic display technology has been developed associating with digital display technology. However, the main bottleneck of the current autostereoscopic display technology is that it can not have both of high display resolution and wide view angle simultaneously. Most of the technologies divide the pixels on the display device into multiple groups and guide them into different directions so as to form multiple viewing zones, accordingly, users can see different images from different directions. Users can obtain stereoscopic display effect when viewing the images in different viewing zones through the two eyes. However, when users' two eyes are not in an appropriate specific location, users can not see the stereo-image. The number of the divided groups of the pixels must be increased in order to let users see the stereo-image in any viewing angle. Accordingly, in the condition that the total quantity of the physical pixels in the display device is a fixed number, the resolution of the image would be compromised. For example, when the pixels are divided into two groups, the resolution is substantially reduced into a half. In other words, the more the number of the divided groups of the pixels is, the lower the resolution would be.

Also, in order to maintain the image resolution and have more viewing zones, more hardware space and guiding structures must increase, resulting in the increase of the volume of the display device.

Therefore, how to simultaneously have both of high resolution and high freedom of viewing locations is the problem for the manufacturers or the designers.

SUMMARY OF THE INVENTION

Accordingly, the present invention is directed to provide an autostereoscopic display apparatus, which has both of high resolution and high freedom of viewing location simultaneously, so as to improve the display quality of the stereo-images.

The present invention provides an autostereoscopic display apparatus, including multiple micro-display devices for exporting an image. Each of the micro-display devices produces a portion of the total image. The portion image has multiple viewing-zone portion images with respect to multiple viewing zones. An image guiding unit has multiple micro-image output terminals, which are arranged according to an array sequence being set, so as to guide the output image from the micro-display devices. A stereo-image discrete screen is coupled with the image guiding unit, so that the image can transit the stereo-image discrete screen through multiple column transparent regions for producing multiple viewing-zone images of the image with respect to the different viewing zones.

According to the aforementioned autostereoscopic display apparatus in one embodiment of the present invention, the image guiding unit can be, for example, an optical fiber array unit or an array-type light guiding unit.

According to the aforementioned autostereoscopic display apparatus in one embodiment of the present invention, the stereo-image discrete screen is a transparent substrate, and a plurality of striped transparent zones and a plurality of striped opaque zones, arranged in alternation, are disposed on the transparent substrate, wherein the width of the striped transparent zones is less than the width of the striped opaque zones.

According to the aforementioned autostereoscopic display apparatus in one embodiment of the present invention, wherein a microlens is disposed in each of the micro-image output terminals of the image guiding unit, suitable to collect a micro-light-beam from each of the micro-image output terminals. And, for example, there is a distance between the central location of each micro-image output terminal and the central location of the corresponding microlens. The distance is suitable for adjusting the compacted fiber bundle to be suitable for emitting in the viewing zone direction with respect to the stereo-image discrete screen.

According to the aforementioned autostereoscopic display apparatus in one embodiment of the present invention, the micro-image output terminals are arranged in a regular array, or an interlaced array. The interlaced array can increase the distance between the micro-image output terminals so that the image guiding unit is easy for fabrication.

According to the aforementioned autostereoscopic display apparatus in one embodiment of the present invention, the micro-image output terminals belonging to the same pixel column are in the same column transparent region in the stereo-image discrete screen or arranged in at least two successive column transparent regions.

According to one embodiment of the present invention, the aforementioned autostereoscopic display apparatus further includes: a first micro-polarizer structure layer, disposed on an output surface of the image guiding unit, so that each of the micro-image output terminals has a predefined light polarization; and, a second micro-polarizer structure layer, disposed on the stereo-image discrete screen, so that each of the multiple pixels of the image has a predefined light polarization. It is set with respect to the light polarization of the image output terminals so as to reduce the crosstalk between the two adjacent horizontal pixels in the pixels.

According to the aforementioned autostereoscopic display apparatus in one embodiment of the present invention, at least one of the first micro-polarizer structure layer and the second micro-polarizer structure layer is a micro-polarizer, and the micro-polarizer comprises a plurality of first polarizer regions and a plurality of second polarizer regions in assemble.

According to the aforementioned autostereoscopic display apparatus in one embodiment of the present invention, at least one structure layer of the first micro-polarizer structure layer and the second micro-polarizer structure layer includes: a polarizer layer, having a polarization; a micro-retarder, disposed at one side of the polarizer layer. Wherein the micro-retarder layer comprises a plurality of first retarder regions and a plurality of second retarder regions in mixture. After the light transmitting the polarizer, the polarization after passing through the first micro-retarder region is perpendicular to the polarization after passing through the second micro-retarder region.

In order to the make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

The present invention provides an autostereoscopic display apparatus, mainly suitable for compact light signal guiding structure, and stereo-image discrete screen with high image discrete efficiency. Accordingly, the present invention can simultaneously have high display resolution and wide freedom of viewing locations so as to improve the display quality of the stereo-images. And, the volume of the hardware device can also be maintained within an accepted range, so as not to increase the volume of the apparatus greatly. The following will describe some embodiments as examples of the present invention, however the present invention is not limited by the embodiments.

Figure 1:
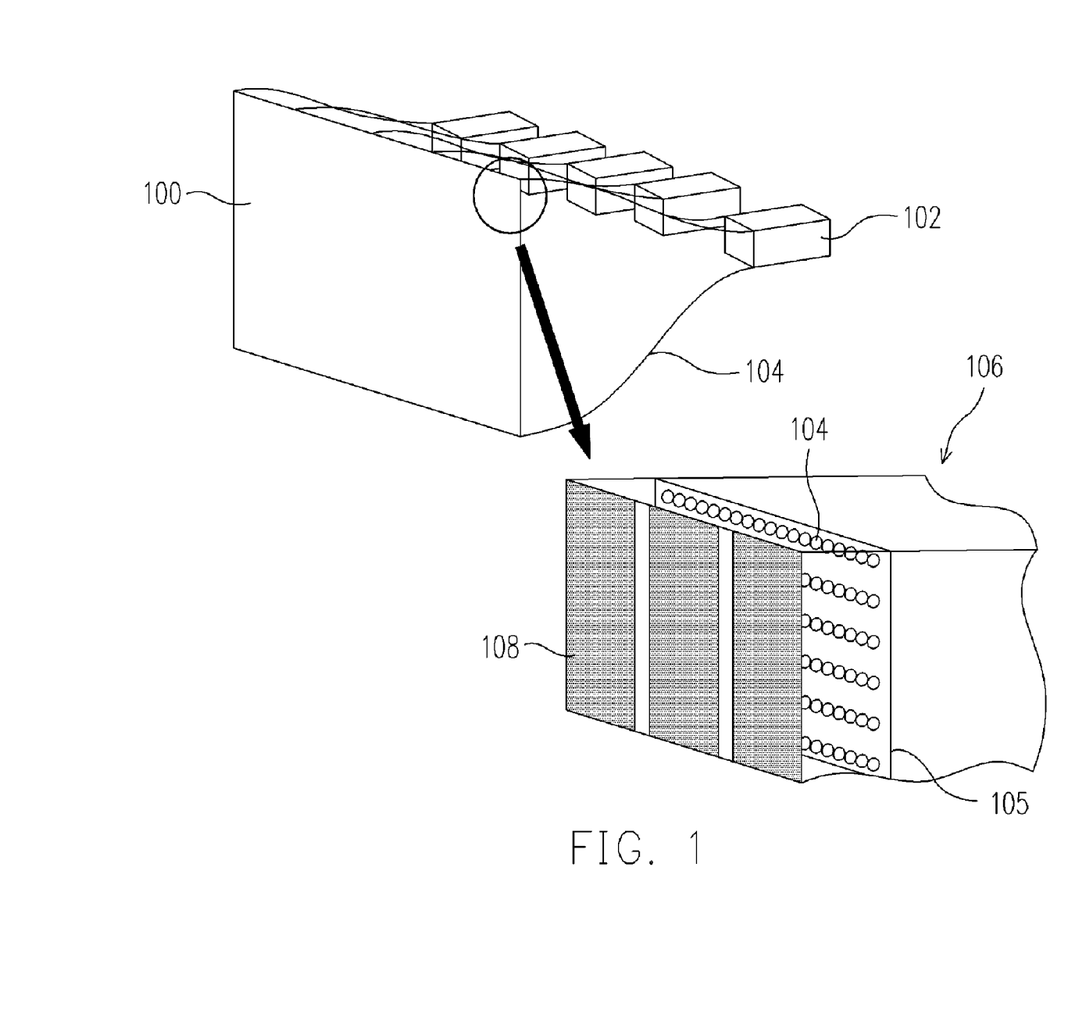
FIG. 1 is a schematic perspective structure diagram of an autostereoscopic display apparatus according to an embodiment of the present invention.

FIG. 1 is a schematic perspective structure diagram of an autostereoscopic display apparatus according to an embodiment of the present invention. Referring to FIG. 1, the autostereoscopic display apparatus of the present invention approximately includes a stereo-image discrete screen 100, an image guiding unit 104, and a plurality of micro-display devices 102. Wherein the detail structure 106 marked in a circle is shown in the right bottom. The micro-display device 102 is suitable for outputting an image to be displayed according to the operation of the entire usage system, for example. Each micro-display device 102 may produce a portion image of the image. The entire image comprises a plurality of portion images individually produced by the micro-display devices 102. All the portion images produced by each micro-display device 102 comprise a plurality of viewing zone portion images with respect to multiple viewing zones. The viewing zone portion images can produce stereoscopic effect to eyes of users.

The image guiding unit 104 is connected between the micro-display device 102 and the stereo-image discrete screen 100 so as to guide the pixel image output from the micro-display device 102 to transit the stereo-image discrete screen 100 and further to eyes of users. A plurality of micro-image output terminals are disposed on the output surface 105 of the image guiding unit 104, for example, the micro-image output terminals are arranged according to an array sequence being set. Each micro-image output terminal can output a pixel data with respect to a specific viewing zone. And, the image guiding unit 104 can also be an array-type light guiding unit which will be described in FIG. 4.

A stereo-image discrete screen 100 is coupled with the image guiding unit 104, so that the image can pass through the stereo-image discrete screen through multiple column transparent regions for producing multiple viewing-zone images of the image with respect to the different viewing zones. The stereo-image discrete screen 100 is, for example, a transparent substrate. A plurality of striped opaque layers 108 are disposed on one side of the transparent substrate, for example, the surface facing users, so as to form a plurality of striped transparent regions and a plurality of striped opaque regions arranged alternately. The opaque layer 108 is, for example, a printed black material layer. The width of the striped transparent regions is less than the width of the opaque striped regions. The number of the striped transparent regions is less than the number of the overall horizontal resolution of all the viewing zones of the image and equal to the number of the horizontal resolution of single viewing zone. In other words, a striped transparent region allows, for example, a pixel column to transit.

Figure 2:
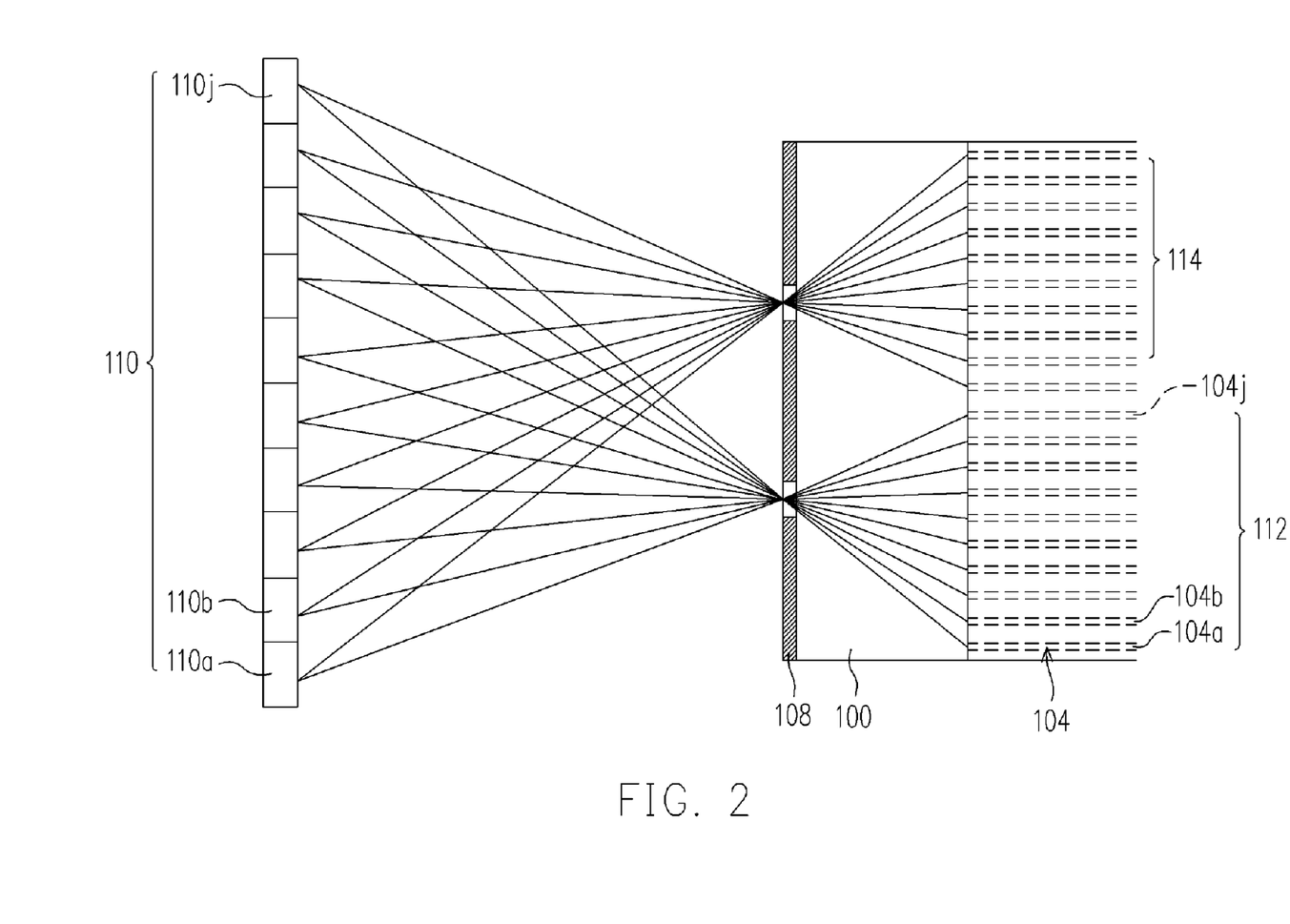
FIG. 2 is a top view of the display mechanism among the viewing zone, the stereo-image discrete screen, and the fiber bundle.

The following will describe the display mechanism of the present invention in detail. FIG. 2 is a top view of the display mechanism among the viewing zone, the stereo-image discrete screen, and the fiber bundle. The image guiding unit 104 is described using the example of the optical fiber array composed of fiber bundles. From the top view, one surface of the stereo-image discrete screen 100 is coupled with the multiple output terminals of the image guiding unit 104. The structure of the opaque layer 108 is disposed on another side of the stereo-image discrete screen 100. Two columns of "3D pixel" are taken as an example. The fiber bundle of the image guiding unit 104 can have a fiber layer arranged in horizon, as shown as dotted line. For example, if the autostereoscopic display would produce ten viewing zones 110a-110j to form a stereo-image, a pixel data 112 may be guided into a couple of perpendicular transparent regions, also called column transparent regions, of the stereo-image discrete screen 100 by the fiber 104a-104j respectively. In other words, the pixel data 112 have ten viewing zone pixel data with respect to the ten viewing zones 110a-110j, respectively, and the ten viewing zone pixel data are guided through the fibers 104a-104j, so that the light signals of the two pixels 112, 114 can enter the corresponding viewing zones by the opaque layer 108. In the embodiment, all the pixel data in the same pixel column transit the same column transparent region and enter the corresponding viewing zones 110a-110j. In the figure, the optical data of the fiber 104a enters the viewing zone 110j.

Figure 3:
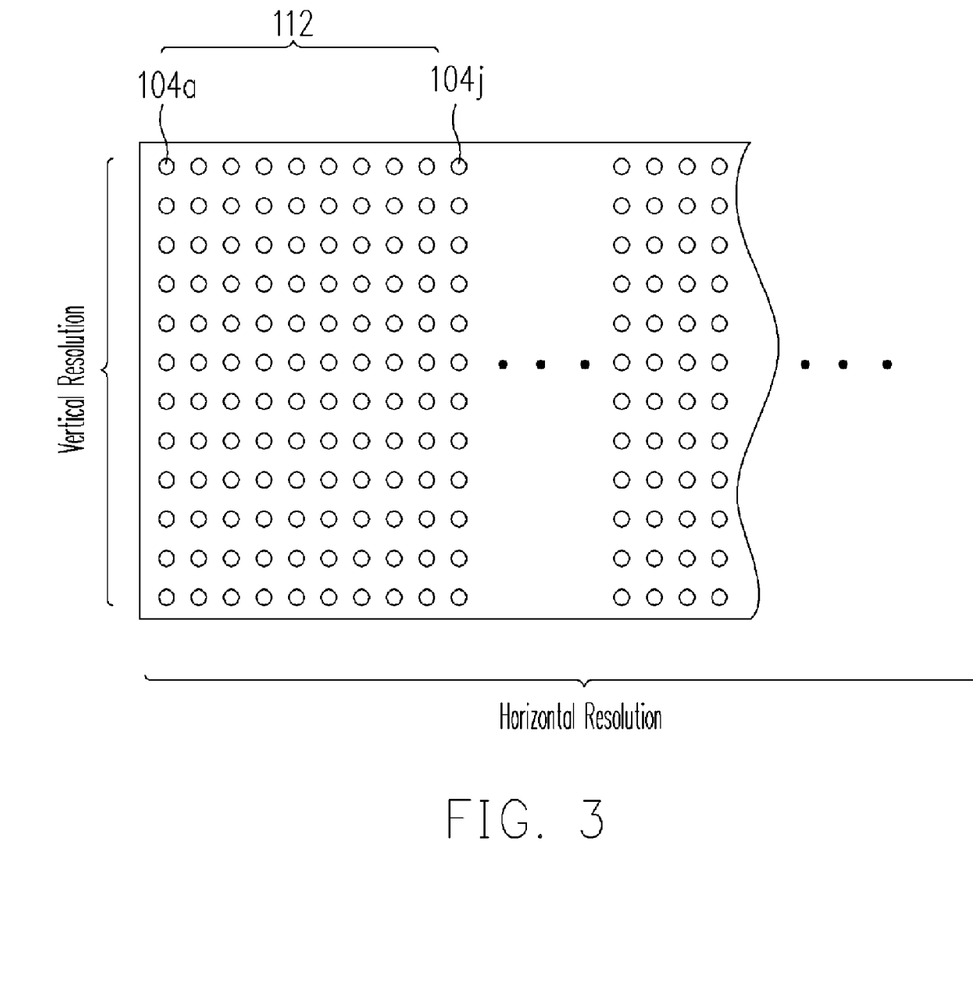
FIG. 3 is a diagram showing the image output terminal on the output surface 105 in FIG. 1.

It can be learned that an image comprises a plurality of pixel columns and a plurality of pixel rows. FIG. 2 shows two pixel data 112, 114 in a pixel row. That is, there is the data of other pixel rows in the direction perpendicular to the view, and the mechanism is similar, therefore the detail is omitted here. FIG. 3 is a diagram showing the image output terminal on the output surface 105 in FIG. 1. The image output terminal is the fiber output terminal in the embodiment. Each pixel has 10 sub-pixels with respect to different viewing zones. Also, if the display apparatus is a color display apparatus, a pixel has three color sub-pixels with respect to the data of red, green, and blue. A stereo-image will produce when eyes in different viewing zones. The wider range of the viewing zones means the wider range of viewing angle. The thickness of the stereo-image discrete screen 100 can also change the range of the viewing angel.

As the image guiding unit 104 is made using the fiber bundles, and the cross-sectional area can be arranged closely, more numbers of viewing zone images are able to be assembled together closely. The images of different viewing zones can be effectively separated by the stereo-image discrete screen 100. Therefore, the present invention can simultaneously have both of high resolution and freedom of viewing locations so as to improve the display quality of the stereo-images.

Figure 4:
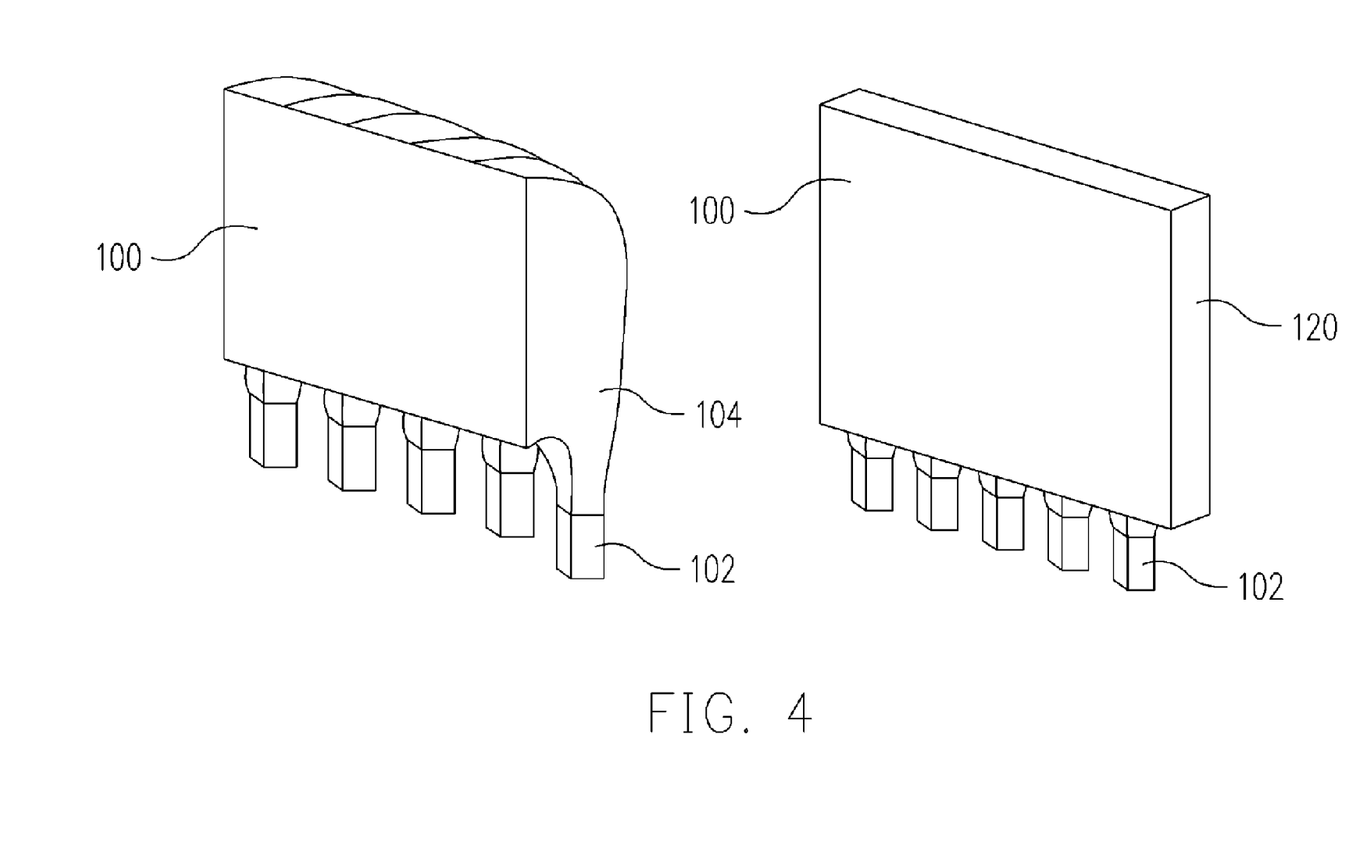
FIG. 4 is a diagram showing the figuration of the autostereoscopic display apparatus of the present invention.

FIG. 4 is a diagram showing the figuration of the autostereoscopic display apparatus of the present invention. When considering the volume of the actual assembly, as the fiber of image guiding unit 104 is flectional, it can be curved appropriately to reduce the entire thickness of the display apparatus. And, associating with the fabrication of the array-type light guiding unit, the fiber bundle can also be substituted by an array-type light guiding structure 120 so as to further reduce the thickness. Of course, the fiber bundle can also be substituted by other possible equivalent structures.

Figure 5:
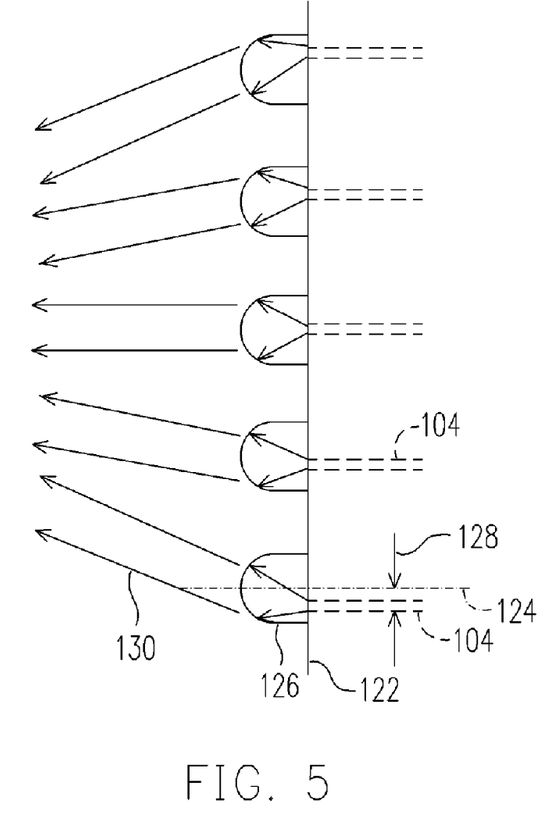
FIG. 5 is a diagram showing the structure further improving the display quality according to one embodiment of the present invention.

Next, FIG. 5 is a diagram showing the structure further improving the display quality according to one embodiment of the present invention. Referring to FIG. 5, for an output terminal surface 122 of the image guiding unit 104, for example that the positions of the multiple output terminals of the fiber bundle are fixed with respect to the output terminal surface 122, a lens 126 can be disposed in each output terminal. The divergent light can be focused by the lens 126. And, there is a distance 128 between the central axis 124 of the lens 126 and the fiber of the image guiding unit 104. The light emitting path 130 can proceed to approach the corresponding column transparent region by pre-adjusting the distance 128, therefore, the display quality is improved, and there is no wasted light signal. The method of adjusting the distance 128 is, for example, aligning the zero distance to the corresponding central output terminal of the column transparent region. The further away from the corresponding column transparent region, the longer the distance 128 would be. The distance 128 may also vary along with other aspects, for example, the curvature of the curved surface of the lens. However, all of these are variation of optical design, but not the only selection of the present invention.

Figure 6:
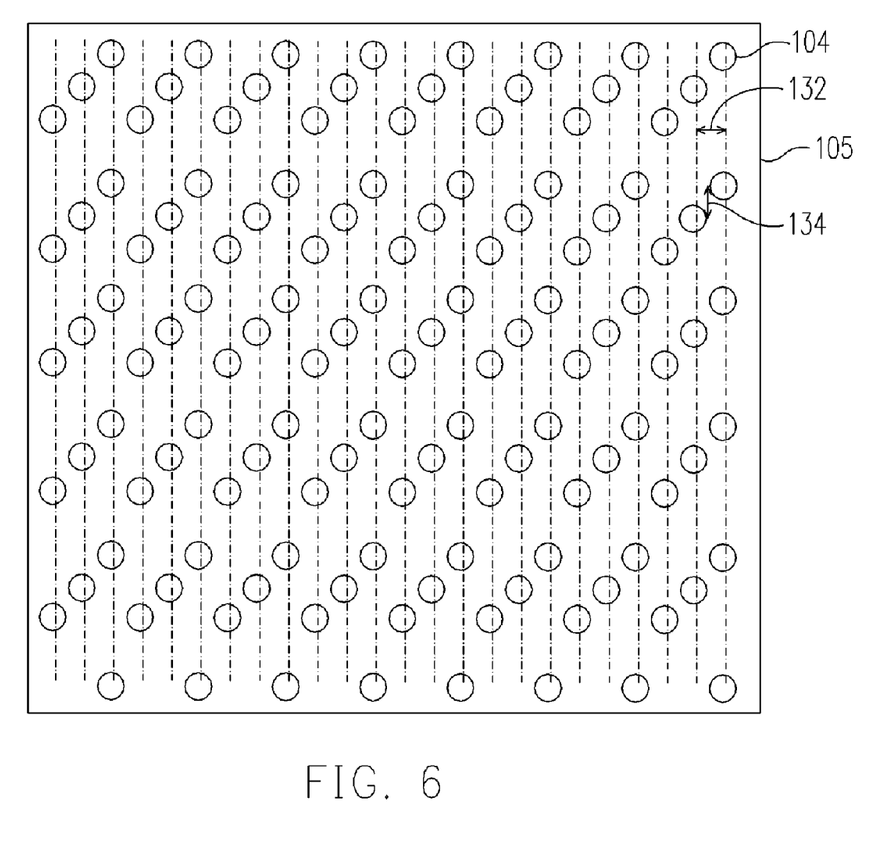
FIG. 6 is a schematic structure diagram showing the interlaced arrangement of the fiber bundles according to one embodiment of the present invention.

And, in order to reduce the area of the output surface 105 (as shown in FIG. 1), the fibers can also be arranged in interlacement. FIG. 6 is a schematic structure diagram showing the interlaced arrangement of the fiber bundles according to one embodiment of the present invention. Referring to FIG. 6, the fiber has a predefined diameter. However, the cross-sectional area of the fiber is circular, therefore, both of the horizontal distance 132 and the vertical distance 134 are less than the diameter of the fiber. When the fiber bundle is assembled by interlaced arrangement, more usage area can be saved. It needs to be noticed that the interlaced arrangement in FIG. 6 is just an embodiment, but not the only selection of the present invention.

Figure 7A:
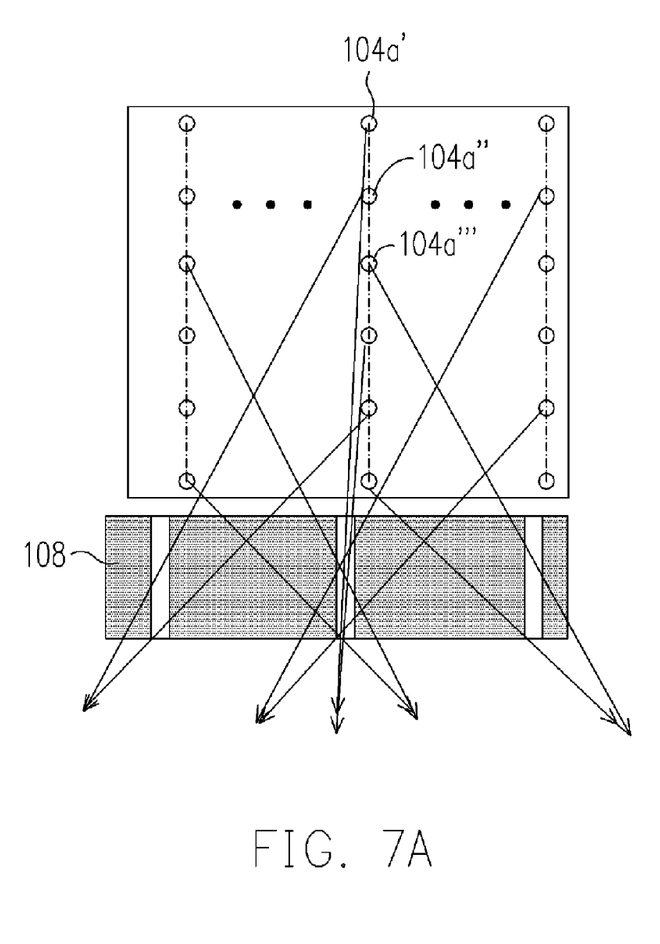
FIG. 7A-7B are schematic diagrams showing the further changed structure of the display apparatus according to one embodiment of the present invention.
Figure 7B:
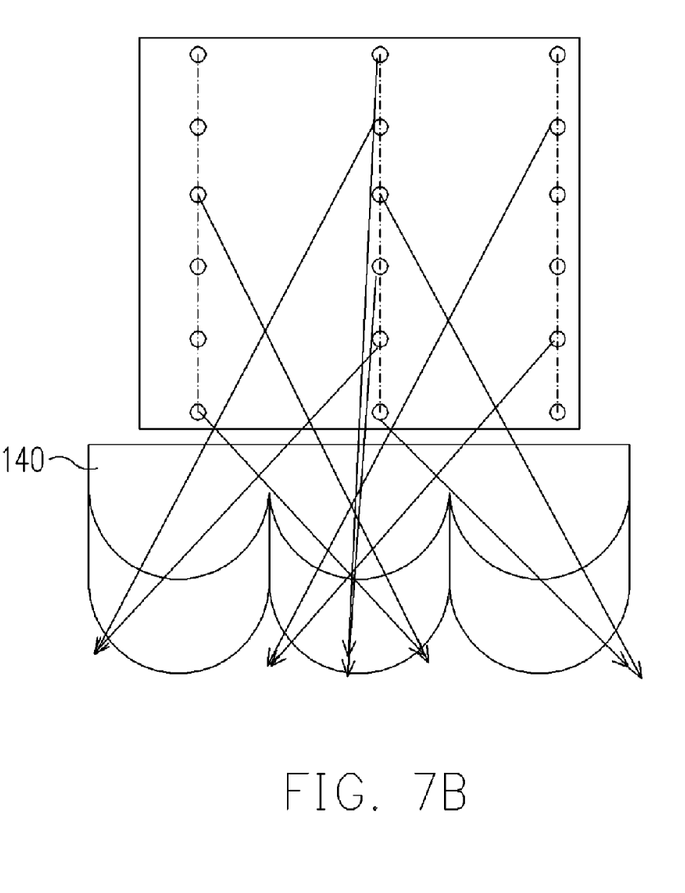

According to the above embodiments, all of the pixels in the same pixel column are designed to transit the same column transparent region, i.e., the region between the two adjacent opaque layers 108, as shown in FIG. 2. However, in order to increase the 3D viewing angle, the pixels in the same pixel column can also be designed to be arranged in adjacent three or more column transparent regions. FIG. 7A-7B are schematic diagrams showing the further changed structure of the display apparatus according to one embodiment of the present invention. In FIG. 7A, for example, the pixel 104a' can transit the main column transparent region, and the pixel 104a'' and the pixel 104a''' can transit the sub-column transparent region adjacent to the main column transparent region. Preferably, the pixel can be arranged in two or three adjacent column transparent regions, or more than three column transparent regions. The three pixels 104a', 104a'', 104a''' may be not arranged in adjacent, but arranged in other mode according to the same principle so as to achieve the purpose of increasing the range of the viewing angle. And, FIG. 7B has the same mechanism as FIG. 7A, and the stereo-image discrete screen 100 is a lenticular plate formed by a plurality of lenticular bars 140 arranged in parallel.

Next, in order to reduce the interference or crosstalk of the adjacent two pixel columns, it can be achieved by using the polarization. In general, referring to FIG. 2, for example, a micro-polarizer structure layer can be disposed on the output surface of the image guiding unit 104, so that each micro-image output terminals has a predefined light polarization. And, another micro-polarizer structure layer can be disposed on the stereo-image discrete screen 100, with respect to the column transparent region between the opaque layers 108. Therefore, each of the multiple pixels of the image has a predefined light polarization. It is set corresponding to the light polarization of the image output terminals so as to reduce the crosstalk between the adjacent two horizontal pixels. It also can be understood that when the crosstalk and the increase of view angle are considered together, the predefined light polarizations for the two micro-polarizer structure layers can be correspondingly set according to the actual design. For example, it is not necessary to have the same polarization state for the same pixel column on the output surface of the image guiding unit 104. The polarization states of terminals for the same pixel column can vary for properly matching to the predefined light polarization of the another micro-polarizer structure layer at the intended column transparent regions between the opaque layers 108.

Figure 8A:
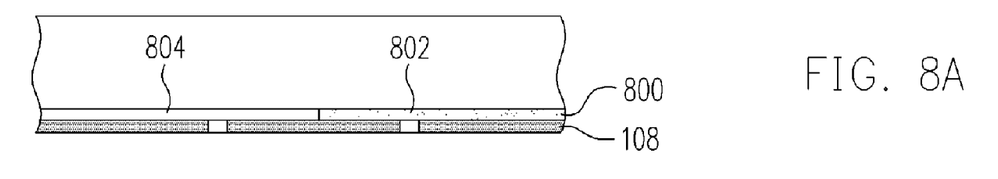
FIG. 8A-8D are schematic diagrams showing the polarizer structure according to one embodiment of the present invention.

FIG. 8A-8D are schematic diagrams showing the polarizer structure according to one embodiment of the present invention. In detail, the desired polarization effect is as shown in FIG. 8A. For the stereo-image discrete screen 100 with respect to the structure of the opaque layer 108, if the opaque layer 108 is disposed in the outmost, a micro-polarizer 800 can be disposed in the inside. The micro-polarizer 800 comprises, for example, a plurality of first micro-polarizer regions 802 and a plurality of second micro-polarizer regions 804 in mixture. The polarization direction of the first micro-polarizer region is perpendicular to the polarization direction of the second micro-polarizer region. Accordingly, the light transiting the micro-polarizer region 802 will not transit the micro-polarizer region 804, and vice versa.

Again, referring to FIG. 8B, the micro-polarizer 800 can also comprises a polarizer layer 806 and a micro-retarder 808. For example, the polarizer layer 806 is disposed between the micro-retarder 808 and the opaque layer 108. Wherein, the micro-retarder 808 comprises a plurality of first micro-retarder regions 810 and a plurality of second micro-retarder regions 812 in mixture. After the light beam passes through the polarizer layer 806 and the micro-retarder 808, the polarization resulting from transiting the first micro-retarder regions 810 is perpendicular to the polarization resulting from passing through the second micro-retarder regions 812. For example, one of the first micro-retarder region 810 and the second micro-retarder region 812 is a zero retarder, and the other is a half wavelength retarder.

Figure 8B:
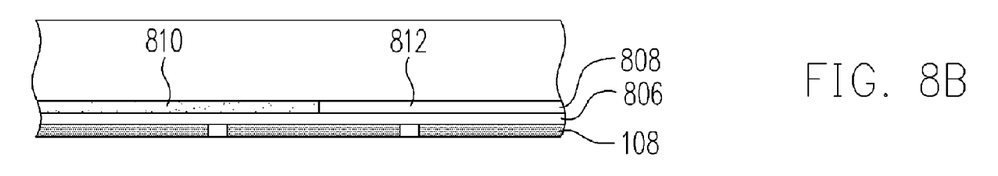
Figure 8C:
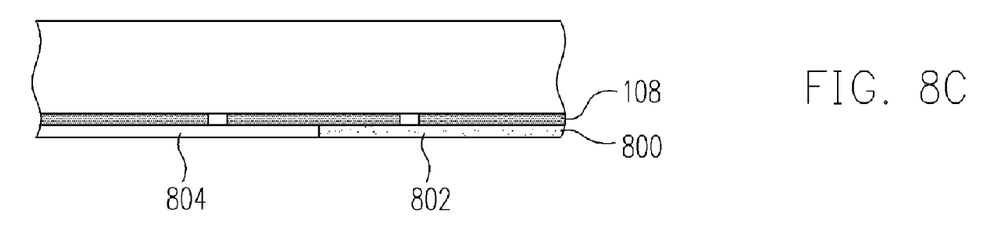
Figure 8D:
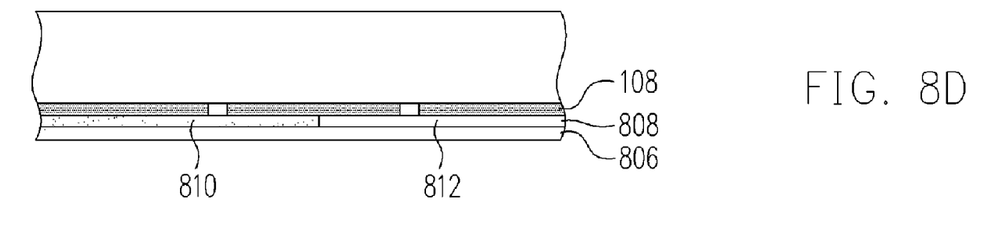

And, the structures in FIG. 8A and FIG. 8B can be replaced each other, as shown in FIG. 8C and FIG. 8D. In other words, the present invention is not limited by the configurations in FIG. 8A-8D, and other configurations which can achieve the same polarization effect are also suitable. And, for example, in order to achieve the effect, the above polarizer can be disposed in the connection surface by which the stereo-image discrete screen 100 is coupled with the image guiding unit 104. Accordingly, for example, the pixel 112 (as shown in FIG. 2) has the same polarization as that of the corresponding column transparent region on the stereo-image discrete screen 100, therefore the pixel 112 can pass through the column transparent region. However, the pixel 112 has different polarization from that of the adjacent non-corresponding column transparent region on the stereo-image discrete screen 100, therefore the pixel 112 can not pass through the adjacent column transparent region. Accordingly, the mutual crosstalk can be reduced.

According to the configuration of the present invention, the present invention simultaneously has both of the high resolution and freedom of viewing locations so as to improve the display quality of stereo-images. The volume of the hardware apparatus can also be kept in an accepted range so as not to substantially increase the volume of the apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An autostereoscopic display apparatus, comprising:
   a plurality of micro-display devices for exporting an image, wherein each of the micro-display devices produces a portion image of the image, wherein the portion image has multiple viewing-zone portion images with respect to multiple viewing zones;
   an image guiding unit, having multiple micro-image output terminals, which are arranged according to an array sequence being set, so as to guide the output image from the micro-display devices;
   a stereo-image discrete screen, coupled with the image guiding unit, so that the image can transit the stereo-image discrete screen through multiple column transparent regions for producing multiple viewing-zone images of the image with respect to the different viewing zones; and
   a plurality of microlenses, wherein one of the microlenses is disposed at each of the micro-image output terminals of the image guiding unit, to collect a micro-light-beam from each of the micro-image output terminals.

2. The autostereoscopic display apparatus as claimed in claim 1, wherein the image guiding unit is an optical fiber array unit.

3. The autostereoscopic display apparatus as claimed in claim 2, wherein a plurality of optical fibers of the optical fiber array unit are curved according to the required thickness of the image display apparatus so as to guide the image output from the micro-display device.

4. The autostereoscopic display apparatus as claimed in claim 1, wherein the image guiding unit is an array-type light guiding unit.

5. The autostereoscopic display apparatus as claimed in claim 1, wherein the stereo-image discrete screen is a transparent substrate, and a plurality of striped transparent zones and a plurality of striped opaque zones, arranged in alternation, are disposed on the transparent substrate, wherein the width of the striped transparent zones is less than the width of the striped opaque zones.

6. The autostereoscopic display apparatus as claimed in claim 5, wherein an opaque layer is disposed in the striped opaque regions.

7. The autostereoscopic display apparatus as claimed in claim 5, wherein the number of the striped opaque zones is equal to or greater than a total number of pixels in a horizontal direction.

8. The autostereoscopic display apparatus as claimed in claim 1, wherein there is a distance between the central location of each micro-image output terminal and the central location of the corresponding one of the plurality of microlenses, and the distance is used for adjusting the compacted fiber bundle to be suitable for emitting in the viewing zone direction with respect to the stereo-image discrete screen.

9. The autostereoscopic display apparatus as claimed in claim 1, wherein the micro-image output terminals are arranged in a regular array.

10. The autostereoscopic display apparatus as claimed in claim 1, wherein the micro-image output terminals are arranged in an interlaced array.

11. The autostereoscopic display apparatus as claimed in claim 1, wherein, in the array sequence of the micro-image output terminals, all of the micro-image output terminals in a same pixel column are guided to one of the same column transparent regions in the stereo-image discrete screen.

12. The autostereoscopic display apparatus as claimed in claim 1, wherein the micro-image output terminals in the same pixel column are guided in at least two successive column transparent regions in the stereo-image discrete screen.

13. The autostereoscopic display apparatus as claimed in claim 12, wherein a plurality of opaque layers are disposed in the stereo-image discrete screen with association with the viewing zones by the micro-image output terminals, so as to form a plurality of opaque regions between the opaque layers.

14. The autostereoscopic display apparatus as claimed in claim 12, wherein a lenticular plate is disposed in the stereo-image discrete screen with association with the viewing zones produced by the micro-image output terminals, and the lenticular plate is formed by a plurality of striped lens connected in parallel.

15. The autostereoscopic display apparatus as claimed in claim 1, further comprises:
   a first micro-polarizer structure layer, disposed on an output surface of the image guiding unit, so that each of the micro-image output terminals has a predefined light polarization; and a second micro-polarizer structure layer, disposed on the stereo-image discrete screen, so that each of multiple pixels of the image has a predefined light polarization which is set with respect to the light polarization of the image output terminals, so as to reduce the crosstalk between adjacent two horizontal pixels.

16. The autostereoscopic display apparatus as claimed in claim 15, wherein at least one of the first micro-polarizer structure layer and the second micro-polarizer structure layer is a micro-polarizer, wherein the micro-polarizer comprises a plurality of first polarizer regions and a plurality of second polarizer regions in mixture, and the polarization direction of the first micro-polarizer regions is perpendicular to the polarization direction of the second micro-polarizer regions.

17. The autostereoscopic display apparatus as claimed in claim 15, wherein at least one layer of the first micro-polarizer structure layer and the second micro-polarizer structure layer comprises:

a polarizer layer, having a polarization; and a micro-retarder, disposed at one side of the polarizer layer, wherein the micro-retarder comprises a plurality of first micro-retarder regions and a plurality of second micro-retarder regions in mixture, wherein, after the light passes the micro-retarder layer and the polarizer layer, the polarization resulting from transiting the first micro-retarder region is perpendicular to the polarization resulting from transiting the second micro-retarder region.

18. The autostereoscopic display apparatus as claimed in claim 17, wherein one of the first micro-retarder region and the second micro-retarder region is a zero retarder, and the other is a half wavelength retarder.

19. The autostereoscopic display apparatus as claimed in claim 17, wherein the polarizer layer is disposed between the micro-retarder and the stereo-image discrete screen.

20. The autostereoscopic display apparatus as claimed in claim 1, wherein each of the column transparent regions crosses over multiple of adjacent pixel rows.

* * * * *